United States Patent [19]
Vlahos et al.

[11] Patent Number: 5,515,109
[45] Date of Patent: May 7, 1996

[54] BACKING COLOR AND LUMINANCE NONUNIFORMITY COMPENSATION

[75] Inventors: Paul Vlahos, Tarzana; Petro Vlahos, Lake Hughes, both of Calif.

[73] Assignee: Ultimatte Corporation, Chatsworth, Calif.

[21] Appl. No.: 417,649

[22] Filed: Apr. 5, 1995

[51] Int. Cl.⁶ .............................. H04N 9/75; H04N 5/272
[52] U.S. Cl. ................................ 348/587; 348/586
[58] Field of Search .................... 348/587, 586, 348/584, 578, 579, 585, 589, 594, 595, 596, 597, 598, 599, 600, 577, 576, 615, 625; 395/266, 268, 269; H04N 5/272, 5/275, 5/262, 9/75

[56] References Cited

U.S. PATENT DOCUMENTS

| | | | |
|---|---|---|---|
| 4,344,085 | 8/1982 | Vlahos | 348/586 |
| 4,625,231 | 11/1986 | Vlahos | 348/587 |
| 5,032,901 | 7/1991 | Vlahos | 348/587 |
| 5,146,315 | 9/1992 | Müler | 348/587 |
| 5,301,016 | 4/1994 | Gehrmann | 348/586 |
| 5,343,252 | 8/1994 | Dadourian | 348/587 |
| 5,400,081 | 3/1995 | Chaplin | 348/587 |

Primary Examiner—Safet Metjahic
Attorney, Agent, or Firm—Blakely, Sokoloff, Taylor & Zafman

[57] ABSTRACT

A method and apparatus used in the field of image compositing which eliminates the need to obtain an original clear frame of the backing during production, by synthesizing during post production a clear frame of the backing from a frame of the foreground scene that includes the subject as well as the backing. This synthetic clear frame eliminates the problems of obtaining a registered clear frame during production, and thereby permits the ready application of non-uniformity correction to image compositing in both motion pictures and graphic arts. The invention is also directed to a method and apparatus used in the field of image compositing which reduces the processing time for developing the inhibit signal that prevents the corrections from being applied to the subject, the control signal $E_c$, and a number of other functions that are computed from the colored backing. It is possible to generate only that portion of a clear-frame needed to apply screen correction, and thereby save a major portion of the time needed to process and composite the image.

15 Claims, 2 Drawing Sheets

BACKING COLOR AND LUMINANCE NONUNIFORMITY COMPENSATION

BACKGROUND OF THE INVENTION

Composite photography is a process for inserting a foreground subject into a background scene. The subject is photographed against a colored backing, typically blue or green. The physical backing often consists of a translucent projection screen, rear illuminated by blue light, thus the name Blue Screen Composite Photography.

In the motion picture industry, the foreground and background scenes are photographed on film which is subsequently scanned to produce high definition RGB signals for computer assisted image compositing. In the compositing process, the colored backing is replaced with a background scene so that the foreground subject and the background scene appear to be a single scene.

A linear image compositing process provides a linear relationship between the luminance and visibility of the colored backing and the signal level of the background scene. It is therefore essential to obtain uniform illumination of the backing. U.S. Pat. Nos. 4,344,085 and 4,625,231 are examples of such a linear compositing process.

Small or rear illuminated backings can be illuminated with good uniformity. A large blue backing that includes a blue floor, and one or more blue set pieces, are front illuminated with multiple light sources which must be kept out of camera view. These multiple light sources; the shadows cast by blue set pieces; the low reflection angle from the blue floor to the camera; all make it impossible to produce a blue field of uniform luminance and color.

The blue floor is necessary if the actor, i.e., the foreground subject, including his feet, is to fully appear in the background scene. Blue set pieces, having the size and shape of objects in the background scene, permit the actor to appear to move among, on, and behind, such background objects. This apparent interaction with background objects adds to the illusion of realism.

The sensitivity of the linear image compositing method to backing luminance and color uniformity, and the need to composite scenes that include a blue floor, led to the invention of "Backing Color and Luminance Nonuniformity Compensation", U.S. Pat. No. 5,032,901. The backing luminance and color correction method taught in this patent requires a registered clear frame for each scene in which all subjects, including all furniture and other non-blue set pieces, have been cleared from camera view. The resulting clear frame shows the blue backing with all its lighting imperfections as well as shadows from blue set pieces.

In accordance with U.S. Pat. No. 5,032,901, correction of nonuniformity is accomplished by selecting a well-illuminated point on the backing and matching the RGB levels for every point on the backing to the RGB levels of the selected reference point. The subject therefore appears before a perfectly uniform field of blue. The clear frame is compared with the uncorrected foreground scene so as to generate an inhibit signal that will prevent the corrections from being applied to the subject.

Backing luminance and color correction as taught by U.S. Pat. No. 5,032,901 is an elegant solution to the backing nonuniformity problem, but its application has been difficult. Motion picture shooting is typically behind schedule, and there is rarely enough time to clear the set of people and set objects, for each scene, to obtain a few clear frames of the backing. Nonuniformity correction has therefore found limited application in motion pictures.

In the case of image compositing for still photography as applied to the graphic arts, the large film formats and cameras are usually not pin registered (i.e., are not accurately locked in position), nor are the camera platforms uniformly stable. Registration of a clear frame under these conditions is difficult and time consuming. Nonuniformity correction has therefore found limited application in the graphic arts.

SUMMARY OF THE INVENTION

The invention is directed to a method and apparatus used in the field of image compositing which eliminates the need to obtain an original clear frame of the backing during production, by synthesizing during post production a clear frame of the backing from a frame of the foreground scene that includes the subject as well as the backing. This synthetic clear frame eliminates the problems of obtaining a registered clear frame during production, and thereby permits the ready application of nonuniformity correction to image compositing in both motion pictures and graphic arts.

The invention is also directed to a method and apparatus used in the field of image compositing which reduces the processing time for developing the inhibit signal that prevents the corrections from being applied to the subject, the control signal $E_c$, and a number of other functions that are computed from the colored backing. It is possible to generate only that portion of a clear-frame needed to apply screen correction, and thereby save a major portion of the time needed to process and composite the image.

DETAILED DESCRIPTION OF THE INVENTION

Figure 1:
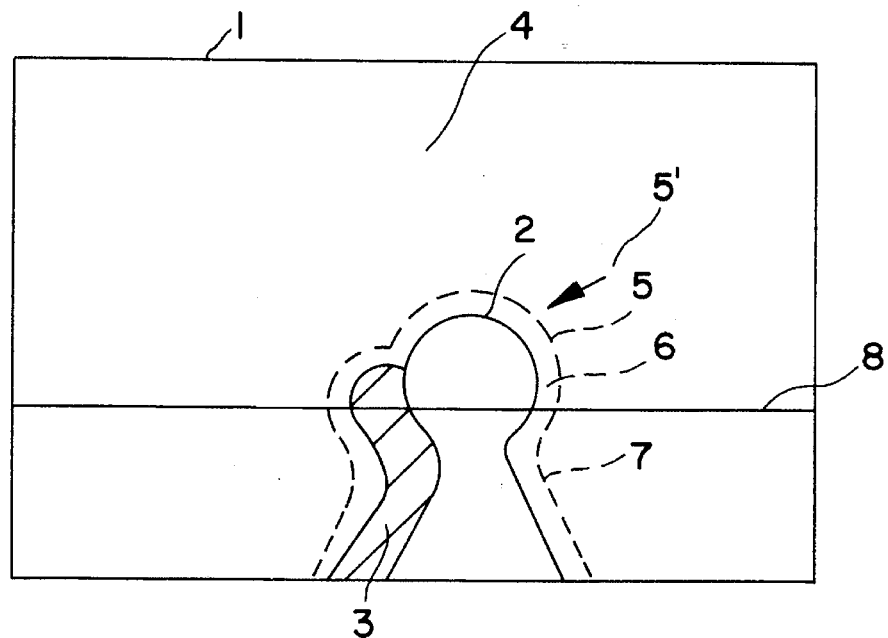
FIG. 1 is an illustration of a foreground scene including a foreground subject and colored backing to be used in a composite image.

This invention is explained as follows: FIG. 1, illustrates the display of a foreground scene 1 consisting of a subject 2 and the subject's shadow 3 against a blue backing 4. A display cursor 5' is manually moved, by mouse or equivalent, to draw a line 5 that surrounds the subject and the subject's shadow as shown. This boundary line 5 is drawn close to the subject, but not touching it. The address (i.e., the horizontal and vertical position on the display) of each pixel along the line is placed in a clear frame memory.

When the subject is in motion, or out of focus, it will exhibit a semitransparent blur at its edges. Spacing the line 5 out a short distance from the subject assures that this semitransparent blur is not cut off. The boundary line and the area it surrounds is defined as the bounded area 6. Scan line 8 crosses the bounded area.

Figure 2:
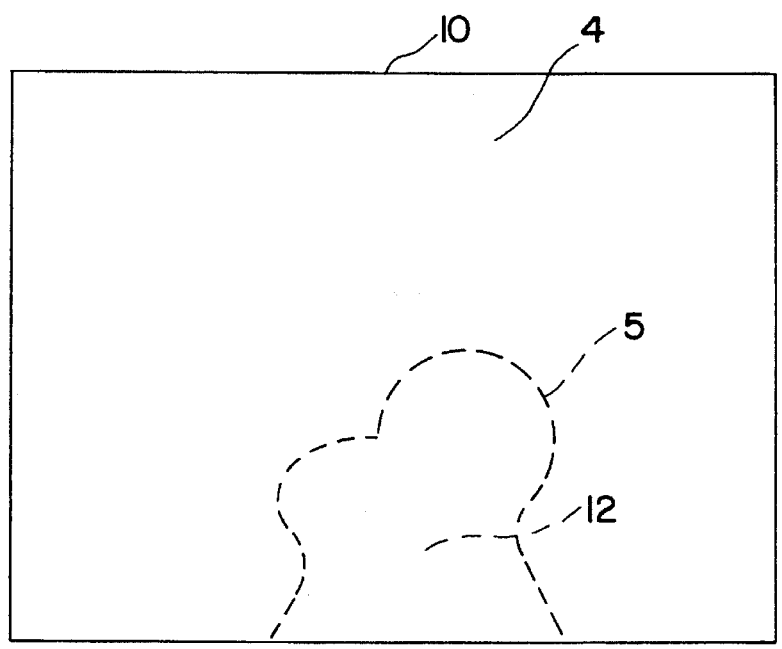
FIG. 2 is an illustration of a clear frame of the blue backing in which the RGB levels of the blue backing within the bounded area 5 are generated by extrapolation and/or interpolation.

FIG. 2 shows what will become the clear-frame memory, 10. The backing area 4 of FIG. 1 is the same backing area one would have photographed in a clear frame. The RGB signals from this area may therefore be stored as area 4 in clear frame memory 10, shown as FIG. 2. FIG. 2 also shows the bounded area 12 which includes the transition area 6 from FIG. 1 as well as the subject 2 and shadow 3. The RGB signals on scan line 8 (FIG. 1) may be extrapolated and/or interpolated across the bounded area with reference to the pixel values outside the bounded area, but which are on the scan line to generate RGB signals that might have existed behind the subject. These interpolated signals for line 8 are stored in clear frame memory 10. In a similar manner RGB signals may be generated for all scan lines crossing the bounded area. The clear frame memory 10 is an exact duplicate of a true clear frame in the backing area 4, and is almost a perfect duplicate in the bounded area 12.

The extrapolated data will be quite accurate for a short extrapolation distance. Accuracy is needed only in the narrow blue band 6 between the boundary line and the subject. The RGB values in the backing area behind the opaque subject 2 are of little concern since this area of the backing is covered by the foreground subject and needs no correction. A simple linear extrapolation is normally sufficient.

Boundary line 5 should be drawn far enough away from the subject to avoid touching the semi-transparent blue at the edge of a moving subject. The extrapolated RGB data should therefore agree with the RGB data inside band 6 for a few pixels. The entire purpose of extrapolation is to generate RGB backing data for the partially hidden backing caused by a partially transparent subject. More accurate extrapolated data may be obtained by extending a data curve into the bounded area, and by a vertical and/or angular scan. The data curve is obtained from changes in the RGB values on any line penetrating the boundary line from any angle.

When the backing is illuminated from above or from one side, the illumination will fall uniformly across the backing from a higher level to a lower level. Because of this smooth transition, one may encompass the subject with a rectangular, circular, or oval window as generated by a typical window generator. The use of a window generator eliminates the need for a hand drawn window to encompass the subject.

The uniform shapes (rectangle, oval, etc.) provided by a window generator does not conform closely to the non uniform shape of the typical subject. Where conformity is poor, the extrapolation distance from window edge to subject is increased. However the extrapolation accuracy will be quite good because of the uniformly changing luminance across the backing.

The synthesized clear frame 10 may then substitute directly for the clear frame called for in U.S. Pat. No. 5,032,901, Backing Color and Luminance Nonuniformity Compensation. This synthesized clear frame solves the problem of obtaining a clear frame on the set.

In the following discussion, the shorter term "Screen Correction" is used to designate the term "Backing Luminance and Color Nonuniformity Correction".

The procedure described above does not reduce the processing time for developing the inhibit signal, the control signal, and a number of other functions that are computed from the colored backing. It is possible to generate only that portion of a clear-frame needed to apply screen correction, and thereby save a major portion of the time needed to process and composite the image.

In examining FIG. 1, four areas may be recognized. The first is the unobscured backing area 4. This area contains no elements of the foreground subject. It extends from the edge of the frame to the boundary line 5 which surrounds the subject.

The second area is the narrow blue band 6 between the boundary line 5 and the opaque subject 2. This area includes a small portion of the blue backing as well as the backing-to-subject transition area containing mixed elements of the foreground subject and blue backing. Band 6 may represent only 2 to 5% of the backing area. It is only the area within blue band 6 for which clear-frame data must be synthesized.

The third area is the opaque non-blue subject 2. The fourth area is the subject's shadow 3. The shadow is included as part of the bounded area if the shadow is to be retained, and is excluded from the bounded area if the shadow is to be eliminated. In fact any object not within the bounded area will be eliminated by the "screen correction" method described here.

Implementation requires the address of the pixels representing these areas or their boundaries. The boundary line addresses are known since they are placed in memory as the line is being drawn. All pixels outside the bounded area define the unobscured backing area. The opaque subject is defined as that area in which the background control signal $E_c$ is zero. The transition area lies between these two known areas.

In the image compositing process, as described in the referenced compositing patents U.S. Pat. Nos. 4,344,085 and 4,625,231, a control signal is generated by an equation such as:

$$E_c = k[(B-K_1) - \max(G,R)] \qquad \text{Eq. 1}$$

This control signal $E_c$ controls the level of the background scene. It is 1.0 in a fully illuminated area of the backing; some value less than 1.0 in semitransparent subject areas, and zero in an opaque subject area. A control signal of zero therefore identifies an opaque non-blue subject area 2.

The end result of the signal processing, in a linear image compositing process, is to generate a processed foreground (FG) video signal (PRV), and a background scene level-control signal, $E_c$. The processed video (PRV) is a FG scene in which the blue backing is removed by subtracting a portion of control signal $E_c$ from the foreground video just sufficient to reduce the blue backing to a black backing, (i.e., zero level).

The control signal $E_c$ is often referred to as the alpha channel. In applying screen correction, a major saving in processing time is possible by limiting screen correction to the transition area 6 and assigning values to the alpha channel and a processed video (PRV) channel, in all areas other than the blue band. The method for determining assigned values and generating screen corrected data in the transition area is explained with the aid of FIG. 3.

An image of the foreground scene 1 includes the blue backing 4, and a subject 2, and is held in a full frame memory, labeled "FG scene". It may also contain a backing shadow 3. A boundary line 5 has been drawn to surround the subject and its shadow. The address of the pixels forming this line are placed in clear frame memory 20. The backing area and the bounded area are therefore identified by boundary line 5. A screen corrected unobscured backing area will result in an $E_c$ or alpha channel value of 1.0. Therefore, one may omit screen correction and $E_c$ calculations and simply assign an $E_c$ value of 1.0 in an alpha channel memory 30 for all pixels in the area (31) outside the bounded area. Since the unobscurred backing area 41 in the processed video channel memory 40 is known, all pixels in this area are assigned a value of zero.

It is necessary to calculate an $E_{cs}$ 22 within the bounded area 5 of full frame memory 20 so as to identify the opaque subject, where $E_{cs}$ represents the control signal generated from the subject frame 1, using equation 1. The opaque subject area 2 (also represented by 33 and 43 in FIG. 3) is identified as that area in which $E_c$ is zero. Therefore all pixels in the subject area 33 of alpha channel memory 30, are assigned a value of zero. The RGB signals representing the opaque subject 2 in subject frame 1 may be transferred to corresponding addresses 43 in the processed video channel memory 40.

All of the screen-corrected data for the alpha channel memory and the processed video channel memory is now complete, except for the transition area. The RGB signals for this area are generated as follows:

A scan line 8 that passes through the subject 2 will also pass through the bounded or transition area 6. The RGB signal levels on a scan line are extrapolated from the boundary line to the subject. This extrapolated RGB data will be reasonably accurate in representing the blue backing over the short distance between the boundary line and the subject. It is not necessary to extrapolate or interpolate behind the opaque subject since the backing is not visible in this area and therefore no correction is necessary. An $E_{cs}$ of zero may be used to terminate the extrapolation process.

The extrapolation process covers only the transition area 6 from the boundary line 5 to the opaque subject 2. The clear-frame RGB signal levels for the transition area 6, as determined by extrapolation (or interpolation) are placed in the clear-frame memory 20. This synthesized data is generated only for the transition area 6 which is the only area for which screen correction calculations must be made.

Screen corrections are generated from the clear frame memory 20 by selecting a point 7 on boundary line 5 to act as a standard reference point. This point is selected where the backing area is at or near full illumination. The RGB signal levels at the reference point 7 represent an average of a group of local pixels so as to minimize grain noise. The RGB levels of each pixel within the transition area 6, are compared 24 with the RGB levels at the reference point 7 and correction data representing the differences between the two compared values is stored in memory 28.

The differences resulting from this comparison are screen corrections, which are to be added back to the foreground scene RGB signals in the transition area. However, these corrections must first be inhibited to the extent the backing was obscured by the semitransparent portions of the subject. An inhibit signal is generated by taking the ratio 23 of $E_{cs}$ 22, from subject frame 1, and $E_{cc}$ 21 from clear frame 20, where $E_{cc}$ 21 and $E_{cs}$ 22 are derived using equation 1.

The contents of memory 28, representing a correction signal, and the inhibit signal from ratio 23, are multiplied in multiplier 26 so as to partially inhibit corrections when $E_{cs}$ is less than 1.0, and fully inhibit corrections when $E_{cs}$ is at zero.

Corrections, as inhibited by multiplier 26 are added by adder 27 to the foreground scene video within the transition area 6 to form the screen corrected foreground scene video. A new $E_{ct}$ signal 36 is generated from the RGB signals in the screen corrected transition area using equation 1.

The new $E_{ct}$ signal is adjusted to a value of 1.0 at the reference point, 7. The adjusted $E_{ct}$ is then transferred to all the pixels in the transition area 32 of the alpha channel memory 30. All areas of the alpha channel now have valid data for a scene that included screen correction.

$E_{ct}$ is also adjusted, using for example a potentiometer 28, to match the RGB signal levels at the reference point 7 and the adjusted $E_{ct}$ is subtracted by difference circuit 37 from the transition area signal levels reducing the blue backing RGB signal components to zero within the transition area. The transition area, having its blue backing components subtracted therefrom are then transferred to the processed video memory 40 in the transition area 42. All areas of the processed video channel now have valid data for a scene that included screen correction.

To produce a composite image, a background scene 44, under control 45 of the $E_c$ of alpha channel memory 30, is simply added 46 to the processed video channel 40 to form the composite image 47.

The method described above limits the calculations required for screen correction to a narrow blue band 6 which is about 2 to 5% of the backing area, and the primary $E_c$ calculations are limited to the bounded area encompassing the subject.

This invention permits the application of screen correction to both motion pictures and to still photos used in graphic arts, without requiring a registered clear frame to be made on the set. It also results in a major reduction in image processing time.

A typical 20 second motion picture blue screen shot, photographed at 24 frames per second results in 480 individual frames of film to composite. Even at one minute per frame, it would take 8 hours to complete this scene. The process can be shortened by being a little less precise in drawing the boundary line by drawing it a little farther away from the subject. On successive frames a joy stick or cursor can be used to quickly shift the entire boundary line to again encompass the subject. Where there is little subject motion for two seconds, for example, no change in the position of the boundary line is needed for a succession of 48 frames.

Having drawn the boundary line loosely around the subject extends the distance over which the backing signals must be extrapolated, which could reduce extrapolation accuracy. However, the actual transition area containing mixed elements of the blue backing and the subject can be precisely defined as that small blur at the edge of a moving object. By confining screen connection to this true transition area, calculation time can be further reduced. Since $E_c$ was determined for the bounded area, the processed video (PRV) may be determined for this same area as described earlier. The actual transition area is defined as those pixels in which:

PRV>0, and $E_c$>0.

A (new) true transition boundary line is thereby determined automatically, and the transition width will be, in most cases, a tiny fraction of the transition width created by the hand drawn boundary. The loosely drawn boundary line 5 is still required to limit the area for which $E_c$ calculations are made. Utilizing the above criteria (PRV>0, $E_c$>0), all pixels meeting these criteria constitute the actual transition area. Boundary line 5 no longer represents the edge of the transition area. Because of the very short distance across the true transition area, all pixels on a given scan line within the transition may be assigned the same RGB signal level as the pixel at the backing-transition boundary. In most cases, extrapolation would not be required.

Scenes with rapid cross screen motion produce a much wider blur. An option is provided to use extrapolation, or assignment, to synthesize the clear frame levels in the transition area. An operator makes this decision depending on the extensiveness of backing nonuniformity and the degree of blur in the subject.

The use of the true transition area eliminates the shadow. However, a "soft" line drawn at the edge of the shadow can reinsert the shadow at an assigned density. This shadow insertion technique eliminates the need for screen correction in the shadow area. A "soft" line designates a soft transition at the shadow's edge. Softening a line or transition is common in the video art and is a standard feature of many software programs.

In the alpha channel, all pixels in the blue backing area are assigned a noise free value of 1.0, and all pixels in the opaque subject area are assigned a noise free value of zero. In the processed video channel all pixels in the blue backing area are assigned a noise free value of zero.

The opaque subject area in the processed video channel contains the original foreground scene RGB signals which are at the minimum noise level of the compositing system. It is only in the shadow and transition areas that system and grain noise is pronounced. Any application of noise filtering therefore need be applied only to the transition area, and the addresses of this area have been identified above.

The semitransparent image such as the edge of an out-of-focus object, or an object having rapid cross screen motion, is the only area in which each pixel contains RGB signal components of both the subject and the blue backing. This is the transition region between the unobscured backing and the opaque non-blue subject. In many scenes this area is so narrow as to be almost nonexistent.

This is the only area in which screen correction is needed. All other areas, if screen corrected, yield a "one" or a "zero". Since that would have been the outcome of screen correction, one achieves the same result by simply assigning a "one" or "zero" to these areas, leaving only the actual transition area to be screen corrected. The information that would have been provided by a clear frame in this transition area is needed if screen correction is to be achieved in this area.

Equation 1 determines $E_c$ for all areas of the foreground image frame. When $E_c$ is zero, the scanning spot is on the opaque non-blue subject. Thus, area 2 is identified, and its outermost pixels form its boundary. Boundary line 5 is known to be on the blue backing and will have a large $E_c$. Therefore, if selected levels of $E_c$ are adjusted to match the RGB levels existing at a selected reference point on boundary line 5, and are subtracted from the reference point, then the reference point will have zero video as will all other points along the scan line containing the selected point. This assumes that there are no significant cross screen color changes occurring in bounded area 5.

Reducing the blue backing to zero level is defined as processed video (PRV). The transition area is defined as any area in which PRV>0, and $E_c$>0. $E_c$ is required to generate PRV, but it is only required for the subject area and the transition area. Computations can be minimized by limiting the area to be scanned by using a boundary line such as line 5. This will be the only use for boundary line 5.

All pixels within the bounded area having PRV>0, and $E_c$>0 constitute the transition area. All pixels whose processed video is zero, and whose $E_c$ is greater than zero represents the unobstructed blue backing. All pixels whose $E_c$ is zero represent the opaque subject area are therefore identified.

The pixel on the backing, adjacent to a pixel on the transition area, defines the edge of the transition area for a given scan line. The RGB signal levels at this point can be transferred to a clear frame memory. As the scanning line enters the transition area, from both the right and the left, the RGB levels at the blue backing pixel adjoining the transition area can be repeated for all pixels across the transition area. The clear frame memory now contains RGB levels that might have existed in the absence of the subject.

Figure 3:
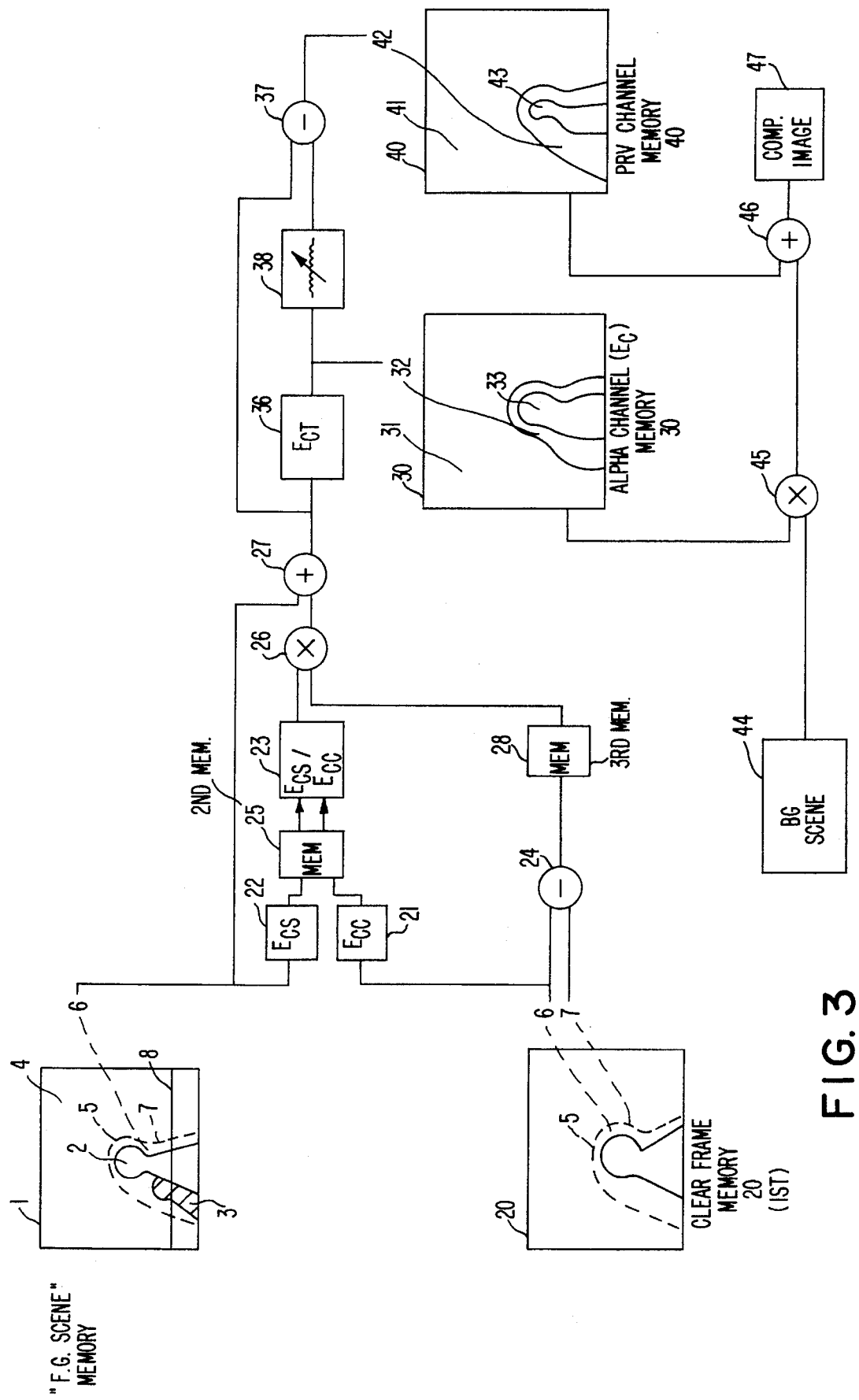
FIG. 3 is an illustration showing the processing performed by the present invention to generate a composite image when incorporating screen correction limited to a small blue band adjacent to the subject.

The remainder of the procedure is the same as described for FIG. 3.

The functions of add, subtract, multiply, divide, memory store and display, are required when implementing this invention. Such functions are readily available in digital hardware. They are also readily available in the form of a desktop computer having adequate memory for high definition images. The computer instructions are those needed to execute the functions as described in the above specification. Although the foregoing description with reference to FIG. 3 shows a number of separate memories, it will be understood by those skilled in the art that while there may be different logical memories, the various stored values may all utilize the same physical memory.

The application of screen correction (U.S. Pat. No. 5,032,901) using a clear frame obtained in production has been implemented in analog hardware (Ultimatte System-6 available from Ultimatte Corporation) and in software (Ultimatte CineFusion available from Ultimatte Corporation).

We claim:

1. A method of removing a subject from a frame of film wherein the subject has been photographed against a colored backing whose luminance and color is nonuniform and generating an approximation of the luminance and color in the backing area formerly occupied by the subject, said method comprising the steps of:

a) displaying an image where said image includes the subject shown against the colored backing, b) generating a bounded area by drawing a boundary line encompassing said subject using a display cursor and storing the address of all pixels on said boundary line in a memory, c) extrapolating and interpolating RGB signal levels on each scan line crossing the bounded area and replacing the signal level at each pixel on said scan line in the bounded area with the RGB signals levels obtained by said extrapolation and interpolation, said signal replacement creating a scene including the colored backing with the subject removed and where said bounded area is filled with RGB signals approximating those signals that are existing on the colored backing behind the subject, where said scene including the colored backing with the subject removed is suitable for use in applying backing luminance and color non-uniformity compensation in an image compositing system;

whereby the colored backing appears to have been photographed in the absence of the subject to produce a clear frame which is employed in applying compensation to remove said backing luminance and color non-uniformity.

2. The method of claim 1 in which the colored backing is a predetermined combination of red, blue and green.

3. The method of claim 1 wherein the scan line entering the bounded area has RGB signal levels whose amplitudes represent a curve and where said curve is extended into the bounded area whereby the accuracy of the extrapolation is improved.

4. The method of claim 1 wherein the pixel field surrounding the bounded area is used to provide RGB signal levels to permit extrapolation of a blue field into the bounded area in one of a vertical and angular direction.

5. A method for eliminating variations of luminance and color in a blue backing employed in blue screen composite photography while simultaneously generating an alpha channel as well as a processed video channel by limiting backing correction to a narrow blue band surrounding a foreground subject, said method comprising the steps of;

a) displaying an image frame of a foreground scene that includes the foreground subject against a blue backing, b) using a cursor to generate a subject boundary line (5) adjacent to but not touching said subject (2) thus creating a bounded area encompassing the subject (2) and a blue band (6) that surrounds the subject, and placing the address of said boundary line in a first memory (20), c) generating a control signal $E_{cs}$, for all pixels within said bounded area, proportional to the luminance and visibility of the blue backing and storing said control signal in a second memory (25), d) identifying an opaque subject area (43) as that area within said bounded area where $E_{cs}$ is zero and defining the area between said boundary line and said opaque subject as a backing-to-subject transition area, e) assigning values to an alpha channel memory (30) in which the value of 1.0 is assigned to all pixels (31) outside (31) said bounded area and assigning a value of zero to all pixels inside (33) said bounded area where said $E_{cs}$ control signal is zero, f) assigning RGB signal levels of zero to a processed video channel memory (40) for all pixels in the blue backing area outside (41) said bounded area, and assigning the existing RGB signal levels (2) in said opaque subject area to corresponding pixels in said processed video channel memory (40), g) determining approximate RGB signal levels within said transition area by at least one of data extrapolation and interpolation of the RGB signal levels of scan lines in the blue backing area that cross said transition area and storing said approximate signal levels in a clear frame memory (20), h) selecting a reference point on said boundary line in said first memory (20) that is at or near full illumination and storing the RGB signal levels of said reference point in said first memory, i) comparing the RGB signal levels of all pixels in said clear frame memory (20) with the RGB levels of said reference point (7) and storing in third memory (28) said differences as correction signals, j) generating an $E_{cc}$ control signal for each pixel in the clear frame memory and storing said $E_{cc}$ signals in said second memory (25), k) generating an inhibit signal $E_{cs}/E_{cc}$ by dividing said subject area control signal $E_{cs}$ by said clear frame control signal $E_{cc}$ (23), l) inhibiting said stored correction signals by multiplying (26) with said inhibit signal and adding said inhibited corrections to corresponding pixels in said transition area (27), thereby removing backing color and luminance nonuniformity, m) generating a control signal $E_{ct}$ (36) for the transition area and storing said $E_{ct}$ control signal levels in the alpha channel memory (30) thereby completing the data entry for all pixels in the alpha channel memory, n) subtracting levels of $E_{ct}$ (37) adjusted (38) to match the RGB levels at said reference point (7) to form a processed video signal in said transition area and storing said processed video in the processed video channel (40), thereby completing the data entry for all pixels in the processed video channel, o) adding (46) the video signals of a selected background scene (44), under control of said alpha channel (30), to the video signals of said processed video channel (40) to form a composite image whose blue backing is corrected for nonuniformity in the transition area by an inhibited correction signal, and corrected in the unobscured backing area by assigning a control signal of 1.0, and assigning a control signal of zero to the backing in the subject area, thereby eliminating calculations for all portions of the composite image excepting for the transition area;

whereby said limited area backing correction together with said generated alpha channel and processed video channel result in a reduction of computer processing time to accomplish backing color and luminance correction and image compositing.

6. A method for eliminating nonuniformity of backing luminance and color in a colored backing employed in composite photography using a background scene and a foreground scene that includes a subject photographed before the colored backing, while simultaneously generating an alpha channel and a processed video channel, by generating inhibited nonuniformity corrections in a predefined transition area between the colored backing and the subject and by assigning fixed control signal levels to substantially all of the alpha channel, said method comprising the steps of;

a) displaying on a video monitor the foreground scene including the subject against the blue backing, wherein elements of said subject have semitransparent edges due to one of subject motion and lack of good focus, b) using a cursor on said display to generate a boundary line enclosing said subject and a narrow band of blue backing surrounding the subject to thereby create a bounded area whose boundary line addresses are placed in a first memory (20), c) generating a control signal $E_{cs}$ (22) from the RGB signals within said bounded area proportional to the luminance and visibility of the blue backing and storing said control signal in a second memory (25), d) identifying the opaque subject area as all pixels within said bounded area where $E_{cs}$ is zero, e) storing said RGB signal levels for said opaque subject area in a processed video memory (40), f) assigning a zero in the alpha channel memory to all pixels in the opaque subject area, g) identifying the backing to subject transition area as all pixels within the bounded area whose PRV>0, and $E_{cs}$>0, h) identifying the unobstructed blue backing area as all pixels not included in the subject area ($E_c$=0), nor in the transition area (PRV>0, $E_c$>0), i) assigning a value of 1.0 in the alpha channel memory for all pixels in the blue backing area as defined in step h), j) assigning RGB values of zero in the processed video channel for all pixels in the blue backing area, k) identifying those pixels on the blue backing adjacent to the transition area and storing said pixels as the blue backing to transition area boundary line, and storing RGB signal levels at corresponding addresses in clear frame memory (20);

l) approximating the RGB backing signal levels in the transition area that would have existed with the subject removed by assigning the RGB signal levels existing at said blue backing boundary line area, to all pixels on the same scan line within the transition area and storing these assigned signal levels in a clear frame memory (20), m) selecting a reference point in said clear frame memory on said backing area boundary line in a well illuminated area of the backing and comparing the RGB signal levels of each pixel within the transition area to the signal levels at said reference point and storing their differences as backing correction signals in a correction data memory (28), n) generating control signal $E_{cc}$ for all pixels in the clear frame memory and storing said $E_{cc}$ control signals in said second memory (25), o) generating a correction inhibit signal as the ratio of $E_{cs}/E_{cc}$ and storing said inhibit signal in said second memory (25), p) multiplying said correction signals with said inhibit signal and adding the inhibited corrections to corresponding pixels in the transition area to form a color and luminance corrected backing in the transition area, q) generating a control signal $E_{ct}$ for the transition area and storing said $E_{ct}$ control signal levels in the alpha channel memory thereby completing the data entry for all pixels in the alpha channel memory, r) subtracting levels of $E_{ct}$ adjusted to match the RGB signal levels at said selected clear frame reference point from the signals in the transition area, to form a processed video signal in said transition area, and storing said processed video in the processed video channel memory (40), thereby completing the data entry for all pixels in the processed video channel, s) adding the video signals of a selected background scene, under control of said alpha channel, to the video signals of said processed video channel to form a composite image whose blue backing is corrected for nonuniformity in the transition area by an inhibited correction signal, and corrected in the unobscured backing area by assigning a control signal of 1.0, and assigning a control signal of zero to the backing in the subject area, thereby eliminating backing nonuniformity, and reducing composite image processing time.

7. The method of claim 5 in which the colored backing is one of blue, green, red, yellow, cyan and magenta.

8. The method of claim 5 in which linear control signals $E_c$, $E_{cs}$, $E_{cc}$, $E_{ct}$ are generated by the equation $E_c = k\{(B-k_1) - \max(G,R)\}$.

9. The method of claim 5 in which shadows on the backing cast by the subject are retained, when the bounded area includes the shadow.

10. The method of claim 5 in which subject shadows and all other non blue objects are eliminated from the composite scene when the boundary line is drawn to exclude such objects and shadows.

11. The method of claim 6 in which the signal levels to be assigned to each scan line in the transition area are obtained by extrapolating the signal levels from outside the transition area.

12. The method of claim 5 in which the backing color and luminance data in the colored backing are extrapolated into the transition area as one of a linear extrapolation and a curved extrapolation, and are employed horizontally from the left or right, vertically downward or upward, or at a predetermined angle depending upon the direction, width, and character of the backing nonuniformity.

13. The method of claim 6 in which subject shadows are retained by the steps of;

a) using the cursor to draw a line on the shadow boundary and storing said line in said first memory, b) assigning a signal level to all pixels within the area enclosed by said boundary line in said first memory, where said assigned signal is between zero and 1.0 to represent the desired shadow density, where 0.1 is a dark shadow density, and 0.8 is a light shadow density, c) softening said boundary line to approximate the edge softness of the displayed shadow, d) replacing the previously assigned value of 1.0 in the alpha channel with the assigned and softened density values, thereby replacing the original shadow with a backing shadow corrected for backing nonuniformity.

14. The method of claim 1 in which the boundary line encompassing the subject is provided by a window generator and is in the form of one of a rectangle, circle or oval.

15. The method of claim 5 in which the boundary line encompassing the subject is provided by a window generator and is in the form of one of a rectangle, circle or oval.

* * * * *

UNITED STATES PATENT AND TRADEMARK OFFICE
CERTIFICATE OF CORRECTION

PATENT NO. : 5,515,109
DATED : May 7, 1996
INVENTOR(S) : Vlahos et al.

It is certified that errors appear in the above-identified patent and that said Letters Patent is hereby corrected as shown below:

In column 6 at line 3, please delete " 28 " and insert -- 38 --.

In column 6 at line 55, please delete " required " and insert -- desired --.

In column 8 at line 41, please delete " signals " and insert -- signal --.

Signed and Sealed this

Eighth Day of October, 1996

Attest:

BRUCE LEHMAN

*Attesting Officer*     *Commissioner of Patents and Trademarks*